(12) United States Patent
Hu et al.

(10) Patent No.: US 12,509,799 B2
(45) Date of Patent: Dec. 30, 2025

(54) ELECTROSPUN FILM, METHOD FOR MANUFACTURING THE SAME AND USE OF SUCH ELECTROSPUN FILM

(71) Applicants: NANODOCKS TECHNOLOGY LIMITED, Hong Kong (CN); CITY UNIVERSITY OF HONG KONG, Hong Kong (CN)

(72) Inventors: Jinlian Hu, Hong Kong (CN); Shuo Shi, Hong Kong (CN); Yifan Si, Hong Kong (CN); Siu Wah Wong, Hong Kong (CN); Muk Fung Yuen, Hong Kong (CN)

(73) Assignees: NANODOCKS TECHNOLOGY LIMITED, Hong Kong (CN); CITY UNIVERSITY OF HONG KONG, Hong Kong (CN)

( * ) Notice: Subject to any disclaimer, the term of this patent is extended or adjusted under 35 U.S.C. 154(b) by 662 days.

(21) Appl. No.: 17/898,644

(22) Filed: Aug. 30, 2022

(65) Prior Publication Data

US 2023/0304191 A1    Sep. 28, 2023

(30) Foreign Application Priority Data

Mar. 22, 2022   (CN) .......................... 202210287164.1

(51) Int. Cl.
| | |
|---|---|
| *C08J 5/18* | (2006.01) |
| *D01D 1/02* | (2006.01) |
| *D01D 5/00* | (2006.01) |
| *D01F 6/48* | (2006.01) |
| *D01F 6/50* | (2006.01) |
| *D04H 1/4318* | (2012.01) |
| *D04H 1/728* | (2012.01) |

(52) U.S. Cl.
CPC .............. *D01D 5/0038* (2013.01); *C08J 5/18* (2013.01); *D01D 1/02* (2013.01); *D01F 6/48* (2013.01); *D01F 6/50* (2013.01); *D04H 1/4318* (2013.01); *D04H 1/728* (2013.01); *C08J 2327/16* (2013.01); *C08J 2429/14* (2013.01); *D10B 2321/042* (2013.01); *D10B 2321/06* (2013.01)

(58) Field of Classification Search
CPC .. D01D 5/0038; D01D 1/02; C08J 5/18; C08J 2327/16; C08J 2429/14; D01F 6/48; D01F 6/50; D04H 1/4318; D04H 1/728; D10B 2321/042; D10B 2321/06
See application file for complete search history.

(56) References Cited

FOREIGN PATENT DOCUMENTS

| | | | | |
|---|---|---|---|---|
| JP | 2007141575 A | * | 6/2007 | |
| KR | 20180037789 A | * | 4/2018 | ............. B29C 70/32 |

* cited by examiner

*Primary Examiner* — Kumar R Bhushan
(74) *Attorney, Agent, or Firm* — WPAT, PC

(57) ABSTRACT

The invention provides an enhanced electrospun film made from polyvinylidene fluoride (PVDF) and at least one low-melting-point polymer in a ratio of 99.9:0.1-90:10 by weight, and the low-melting-point polymer having a melting point lower than the polyvinylidene fluoride and a softening point in the range of 110-140° C. The enhanced electrospun film exhibits excellent mechanical properties, higher moisture permeability and hydrostatic pressure resistance. The invention further provides a method for manufacturing the enhanced PVDF electrospun film, and use of the enhanced PVDF electrospun film in preparing a waterproof and moisture permeable product.

16 Claims, 1 Drawing Sheet

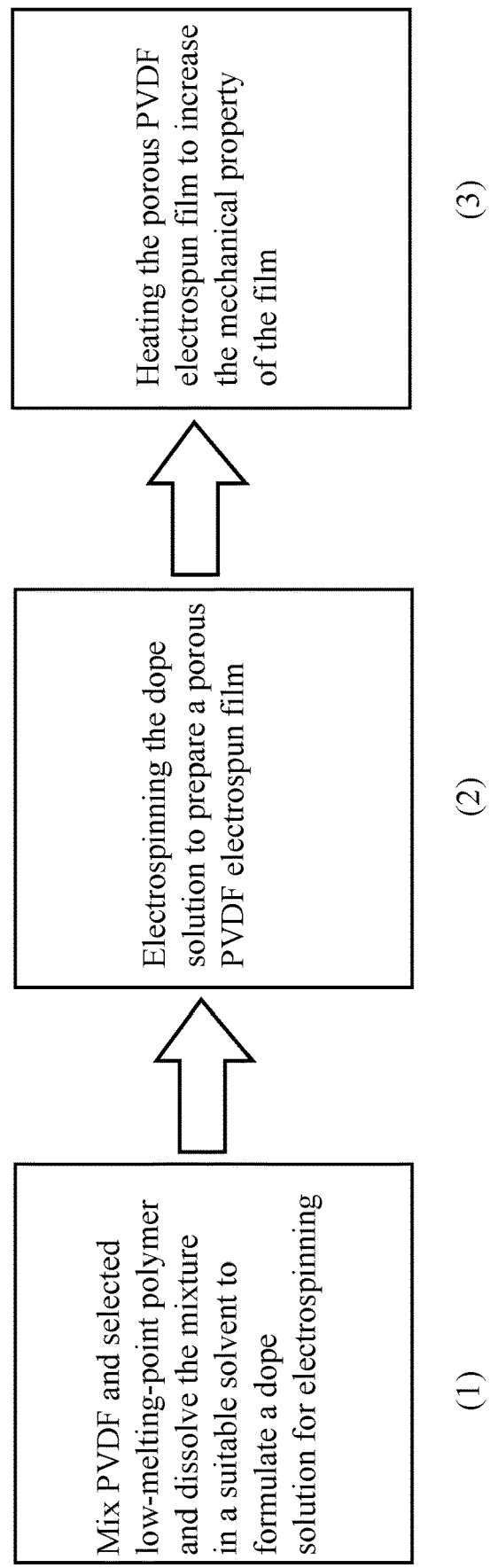

ELECTROSPUN FILM, METHOD FOR MANUFACTURING THE SAME AND USE OF SUCH ELECTROSPUN FILM

TECHNICAL FIELD OF THE INVENTION

The invention relates to an enhanced electrospun film and its manufacturing method as well as use of the electrospun film for manufacturing a waterproof and water vapor permeable product. The enhanced electrospun film exhibits excellent mechanical properties, higher water vapor permeability and hydrostatic pressure resistance.

BACKGROUND OF THE INVENTION

Waterproof and water vapor permeable film materials are widely used in the fields of waterproof and water vapor permeable garments, films of building construction and intelligent wearable devices. Such film materials have good market prospect and the demand for the materials is on the rise. One example of waterproof and water vapor permeable fabrics currently on the market is microporous films of expanded polytetrafluoroethylene and homologs thereof. However, production and application of conventional waterproof and water vapor permeable film materials suffer from the deficiencies including 1. some companies such as Gore-Tex have already deployed a well-developed market layout in the field of expanded polytetrafluoroethylene films; and 2. the expanded polytetrafluoroethylene films are complicated to produce, leading to excessively high production costs.

Presently, a majority of efforts are focused on other production methods, for example electrospinning technology to prepare a new generation of waterproof and water vapor permeable films. Polyvinylidene fluoride (PVDF) is a thermoplastic fluoropolymer with excellent mechanical property, chemical stability, biocompatibility, hydrophobicity, high dielectric strength and resistance to ultraviolet radiation degradation. A PVDF film produced by electrospinning has the advantages including waterproof property, windproof property, breathability (water vapor permeability), high porosity, light mass, softness and the like, and widely finds application in various fields, particularly in the field of waterproof and water vapor permeable materials.

Chinese patent application no. 201410669025.0 published on 1 Apr. 2015 (publication no. CN104480560A) discloses a dope solution of electrospinning polyvinylidene fluoride and a method to produce a polyvinylidene fluoride film having a dendritic structure. The dope solution comprises polyvinylidene fluoride, organic branched salt, a plasticizer and a solvent, and preferably polyvinylidene fluoride is present in the dope solution at a concentration of 10-20%. The dope solution disclosed in this patent application is characterized by addition of the organic branched salt for control dispersion of the dope solution to form the dendritic fibers, and by addition of the plasticizer to stretch and taper the fibers to form nanofibers.

Chinese patent application no. 201310412339.8 published on 11 Dec. 2013 (publication no. CN103437071A) discloses an electrospun nanofiber and its preparation method. The preparation method comprises the steps of 1) formulating a high-melting-point polymeric solution having a mass fraction of 3-50% and a low-melting-point polymeric solution having a mass fraction of 3-50%; 2) electrospinning the high-melting-point polymeric solution and the low-melting-point polymeric solution separately to obtain a high-melting-point polymeric fiber film and a low-melting-point polymeric fiber film; and 3) hot-pressing the high-melting-point polymeric fiber film and the low-melting-point polymeric fiber film to obtain a high strength electrospun nanofiber film.

Methods for manufacturing films by electrospinning technology are available in the prior art, however the electrospun films manufactured therefrom generally have a weak mechanical strength and therefore are not suitable for applications requiring a high mechanical strength. Therefore, there is a need for an electrospun film with high mechanical strength and a method for manufacturing the same.

SUMMARY OF THE INVENTION

One object of the invention is to provide an electrospun film which exhibits excellent mechanical property, higher water vapor permeability and hydrostatic pressure resistance.

Another object of the invention is to provide a method for manufacturing the above electrospun film, and relates to use of this electrospun film for manufacturing a waterproof and water vapor permeable product.

These and other objects of the invention can be satisfied by providing an electrospun film made by polyvinylidene fluoride (PVDF) and at least one low-melting-point polymer having a melting point lower than the PVDF and a softening point in the range of 110-140° C.

Preferably, the low-melting-point polymer may be selected from polyvinyl acetal, low-molecular-weight polyvinylidene fluoride or any combination thereof. The polyvinyl acetal may be selected from polyvinyl butyral (PVB) or polyvinyl formal (PVF). In certain embodiments, the PVDF and the low-melting-point polymer may be provided in a ratio of 99.9:0.1-90:10 by weight.

Preferably, the electrospun film is obtainable by electrospinning a dope solution comprising the PVDF and the low-melting-point polymer to fabricate a film and heating the film.

The electrospun film of the invention has one or more of parameters selected from:
1) breaking strength: ≥20 MPa;
2) water vapor permeability: ≥5,000 g/m$^2$·d; and/or
3) hydrostatic pressure resistance: ≥3,000 mmH$_2$O.

A further aspect of the invention provides a method for manufacturing an electrospun film comprising the steps of:
1) dissolving polyvinylidene fluoride (PVDF) and at least one low-melting-point polymer having a melting point lower than the PVDF in a solvent to formulate a dope solution having a mass fraction of 10-35%;
2) electrospinning the dope solution formulated in Step 1) to produce an electrospun film;
3) heating the electrospun film obtained in Step 2) at a predetermined temperature for a predetermined period of time; and
4) cooling the heated electrospun film.

The dope solution comprises the PVDF and the low-melting-point polymer in a ratio of 99.9:0.1-90:10 by weight.

The solvent useful for formulating the dope solution according to the invention may be selected from the group consisting of N,N-dimethylformamide, acetone, methanol, ethanol, isopropanol, tetrahydrofuran, dichloromethane, chloroform, dimethyl sulfoxide, ethylene glycol, N, N-dimethylacetamide, N-methyl-2-pyrrolidone, cyclohexane, water or any combination thereof.

Step 2) of electrospinning may be carried out at a voltage of 15-35 kV and at an advance rate of 0.1-3 ml/h.

Preferably, the step of heating may be carried out at 110-150° C. for 0.5-4 hours.

The electrospun film of the invention is particularly suitable for use in the waterproof and water vapor permeable fields, and its major parameters, such as mechanical property, water vapor permeability, hydrostatic pressure resistance and the like, are remarkably enhanced in comparison to the prior art counterparts. Therefore, the electrospun film can better prevent liquid water from passing or permeating therethrough while allowing gas or water vapor to permeate. Thus, another aspect of the invention relates to use of the electrospun film for manufacturing a waterproof and water vapor permeable product.

In contrast to the prior art, the invention employs PVDF as a substrate and adopts the PVDF and the low-melting-point polymer in different ratios and having different characteristics to prepare an electrospun film with increased mechanical property. The electrospinning method of the invention imparts a porous structure to the electrospun film which is thus provided with the water vapor permeability. The addition of the low-melting-point polymer and the heat treatment enable the prepared PVDF electrospun film to have better mechanical property, increased water vapor permeability and remarkable hydrostatic pressure resistance. The technical solution of the invention is easy to implement for industrialization due to its simplified workflow and simple process.

BRIEF DESCRIPTION OF THE DRAWINGS

FIG. 1 is a flowchart of an exemplary method for manufacturing an electrospun film according to the invention.

DETAILED DESCRIPTION OF THE INVENTION

The inventive concept and specific structures of the invention with technical effects achieved will be further elaborated below in conjunction with the attached drawing to enable a full understanding of the objects, characteristics and effects of the invention.

The invention primarily relates to a dope solution formulated by mixing PVDF and a low-melting-point polymer, which is subject to the steps of electrospinning and specific heating treatment to prepare an electrospun film. The electrospun film has excellent mechanical property and shows good waterproof performance and water vapor permeability.

The specific process of preparing the electrospun film of the invention is described below in details.

Now turning to Step (1) in FIG. 1, a certain mass of solvent is first poured into a beaker and the solvent may be selected from DMF, acetone or a mixture of DMF and acetone. Then a mixture of PVDF and a corresponding low-melting-point polymer in a given ratio is added into the solvent contained in the beaker. The mixture is stirred to allow thorough dissolution of the PVDF and the low-melting-point polymer in the solvent to obtain a PVDF dope solution at a certain mass concentration, preferably having a mass fraction of 10-35%, for electrospinning.

Then the PVDF dope solution is fed to an electrospinning device where the dope solution is electrospun into a porous film, as shown in Step (2) in FIG. 1. According to the invention, the electrospinning device is operated at a spinning voltage in the range of 15-35 kV and at an advance rate of the dope solution in the range of 0.1-3 ml/h. The substrate adapted for collecting the electrospun film may be selected from a group consisting of aluminum foil, non-woven fabric, woven fabric, baking paper, paper, screen cloth and the like.

Step (3) relates to post-treatment of the PVDF electrospun film, comprising heating the PVDF electrospun film at a temperature of 110-150° C. for 0.5-4 hours so that at least a portion of the low-melting-point polymer melts. After the heat treatment, the at least portion of the molten low-melting-point polymer gets entangled with the PVDF which remains unmelted, whereby an entangled configuration that the molten low-melting-point polymer is deployed among the unmelted PVDF is created in the film. Then, the heated PVDF electrospun film is subject to a cooling treatment to solidify the molten low-melting-point polymer so as to obtain the enhanced PVDF electrospun film of the invention.

According to the invention, the low-melting-point polymer is melted by the heat treatment and then solidified by the cooling treatment, and thus may serve to support and reinforce the film. The PVDF remains unmelted during the producing process of the film and maintains its instinct properties such as good waterproof and windproof performance, remarkable permeability and porosity.

Example 1

A PVDF electrospun film is prepared according to the following procedures, and a unit of weight part is adopted unless specified otherwise.
1) 99.9 parts of PVDF and 0.1 part of PVB were added into a beaker, the mixture was stirred at 60° C. to allow the mixture to dissolve in the solvent, thereby to obtain an electrospinning dope solution having a mass fraction of 20%;
2) the dope solution is subject to electrospinning in the electrospinning device at the voltage of 30 kV and at the advance rate of 0.3 ml/h to prepare a crude PVDF electrospun film; and
3) heating the crude PVDF electrospun film at 120° C. for 2 hours, and then subjecting the heated film to a cooling treatment at room temperature to obtain a high-strength PVDF electrospun film after the heating treatment.

Example 2

A PVDF electrospun film is prepared according to the following procedures, and weight parts are adopted unless specified otherwise.
1) 98 parts of PVDF and 2 parts of PVB were added into a beaker, the mixture was stirred at 60° C. to allow the mixture to dissolve in the solvent, thereby to obtain an electrospinning dope solution having a mass fraction of 20%;
2) the dope solution is subject to electrospinning in the electrospinning device at the voltage of 30 kV and at the advance rate of 0.3 ml/h to prepare a crude PVDF electrospun film; and
3) heating the crude PVDF electrospun film at 120° C. for 2 hours, and then subjecting the heated film to a cooling treatment at room temperature to obtain a high-strength PVDF electrospun film after the heating treatment.

Example 3

A PVDF electrospun film is prepared according to the following procedures, and a unit of weight part is adopted unless specified otherwise.
1) 95 parts of PVDF and 5 parts of PVB were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Example 4

A PVDF electrospun film is prepared according to the following procedures, and a unit of weight part is adopted unless specified otherwise.

1) 90 parts of PVDF and 10 parts of PVB were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Example 5

A PVDF electrospun film is prepared according to the following procedures, and a unit of weight part is adopted unless specified otherwise.

1) 99.9 parts of PVDF and 0.1 part of PVF were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Example 6

A PVDF electrospun film is prepared according to the following procedures, and a unit of weight part is adopted unless specified otherwise.

1) 98 parts of PVDF and 2 parts of PVF were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Example 7

A PVDF electrospun film is prepared according to the following procedures, and a unit of weight part is adopted unless specified otherwise.

1) 95 parts of PVDF and 5 parts of PVF were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Example 8

A PVDF electrospun film is prepared according to the following procedures, and a unit of weight part is adopted unless specified otherwise.

1) 90 parts of PVDF and 10 parts of PVF were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a high-strength PVDF electrospun film after the heating treatment.

Comparative Example 1

A PVDF electrospun film is prepared according to the following procedures, and a unit of weight part is adopted unless specified otherwise.

1) 100 parts of PVDF were added into a beaker, the mixture was stirred at 60° C. to allow the mixture to dissolve in the solvent, thereby to obtain an electrospinning dope solution having a mass fraction of 20%;

2) the dope solution is subject to electrospinning in the electrospinning device at the voltage of 30 kV and at the advance rate of 0.3 ml/h to prepare a crude PVDF electrospun film; and 3) heating the crude PVDF electrospun film at 120° C. for 2 hours, and then subjecting the heated film to a cooling treatment at room temperature to obtain a PVDF electrospun film after the heating treatment.

Assays

Assays were performed to evaluate major parameters including breaking strength, WVP (water vapor permeability) and hydrostatic pressure resistance of the PVDF electrospun films prepared according to the method of the invention and of the PVDF electrospun film prepared according to Comparative Example 1. Specifically, the following test methods were adopted:

ASTM D882 test was used to measure the breaking strength of the PVDF electrospun films on the Instron 5566 tensile tester (at a temperature of 23° C. and 50% of relative humidity);

ASTM E96 BW test was used to measure the WVP of the PVDF electrospun films in Haida HK-100T constant temperature and humidity chamber (at a temperature of 23° C. and 50% of relative humidity); and JIS L1092 A test was used to measure the hydrostatic pressure resistance of the PVDF electrospun films on which a tricot fabric is laid using FX3000 hydrostatic pressure resistance tester.

Table 1 below shows the respective test results of the tests.

TABLE 1

Test Results of Examples 1-8 and Comparative Example

| Example No. | Breaking Strength MPa | Water Vapor Permeability $g/m^2 \cdot d$ | Hydrostatic Pressure Resistance $mmH_2O$ |
|---|---|---|---|
| Example 1 | 15 | 5500 | 3500 |
| Example 2 | 25 | 6000 | 3600 |
| Example 3 | 22 | 5800 | 3800 |
| Example 4 | 17 | 6200 | 3200 |
| Example 5 | 16 | 5300 | 3300 |
| Example 6 | 26 | 5700 | 3500 |
| Example 7 | 23 | 5600 | 3600 |
| Example 8 | 16 | 5400 | 3100 |
| Comparative Example 1 | 12 | 5100 | 3000 |

Analysis of Results

The test results shown in Table 1 reveal the following:
(1) the films of Examples 1-8 all have the breaking strength which is 15 MPa or above, and the breaking strength tends to increase and then decrease as the content of the low-melting-point polymer increases;
(2) the films of Examples 1-8 all have the water vapor permeability which is 500 $g/m^2 \cdot d$ or above;
(3) the films of Examples 1-8 all have the hydrostatic pressure resistance which is 3,000 $mmH_2O$ or above.

The above results confirm that the PVDF electrospun films prepared according to the method of the invention all have the breaking strength, water vapor permeability and hydrostatic pressure resistance that are increased considerably, suggesting that the PVDF electrospun films of the invention exhibit much better waterproof and water vapor permeable performance when compared to the Comparative Example film, and they can replace conventional waterproof and vapor permeable products in the art. Moreover, the method of the invention has the advantages of simple process, low technological requirement and reduced production cost.

While the embodiments described herein are intended as exemplary PVDF electrospun film with high mechanical strength and method for manufacturing the same, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. An electrospun film made by polyvinylidene fluoride (PVDF) and at least one polymer having a melting point lower than the PV DF,
wherein:
the polymer has a softening point in the range of 110-140° C. and is selected from polyvinylidene fluoride;
the electrospun film has water vapor permeability: ≥5,000 $g/m^2 \cdot d$; and
the PVDF and the polymer are provided in a ratio of 99.9:0.1-90:10 by weight.

2. The electrospun film of claim 1, wherein the polymer is further selected from polyvinyl acetal or any combination thereof.

3. The electrospun film of claim 2, wherein the polyvinyl acetal is selected from polyvinyl butyral (PVB) or polyvinyl formal (PVF).

4. The electrospun film of claim 1, wherein the electrospun film is obtainable by electrospinning a dope solution comprising the PVDF and the polymer to fabricate a film and heating the film.

5. The electrospun film of claim 1, wherein the electrospun film also has parameter(s) selected from:
1) Breaking strength: ≥20 M Pa; and/or
2) Hydrostatic pressure resistance: ≥3,000 $mmH_2O$.

6. The electrospun film of claim 2, wherein the polyvinyl acetal is selected from polyvinyl butyral (PVB) or polyvinyl formal (PVF).

7. The electrospun film of claim 1, wherein the electrospun film also has parameter(s) selected from:
1) Breaking strength: ≥20 M Pa; and/or
2) Hydrostatic pressure resistance: ≥3,000 $mmH_2O$.

8. The electrospun film of claim 1, wherein the electrospun film also has parameter(s) selected from:
1) Breaking strength: ≥20 M Pa; and/or
2) Hydrostatic pressure resistance: ≥3,000 $mmH_2O$.

9. A method for manufacturing an electrospun film of claim 1 comprising the steps of:
1) Dissolving polyvinylidene fluoride (PVDF) and at least one polymer having a melting point lower than the polyvinylidene fluoride in a solvent to formulate a dope solution having a mass fraction of 10-35%;
2) Electrospinning the dope solution formulated in Step 1) to produce an electrospun film;
3) heating the electrospun film obtained in Step 2) at a predetermined temperature for a predetermined period of time; and
4) Cooling the heated electrospun film.

10. The method of claim 9, wherein the polymer has a softening point in the range of 110-140° C.

11. The method of claim 9, wherein the polymer is selected from polyvinyl acetal, polyvinylidene fluoride or any combination thereof.

12. The method of claim 9, wherein the PVDF and the polymer is provided in a ratio of 99.9:0.1-90:10 by weight.

13. The method of claim 9, wherein the step of electrostatic spinning is carried out at a voltage of 15-35 kV and at an advance rate of 0.1-3 ml/h.

14. The method of claim 9, wherein the step of heating is carried out at 110-150° C. for 0.5-4 hours.

15. The method of claim 9, wherein the solvent is selected from the group consisting of N,N-dimethylformamide, acetone, methanol, ethanol, isopropanol, tetrahydrofuran, dichloromethane, chloroform, dimethyl sulfoxide, ethylene glycol, N,N-dimethylacetamide, N-methyl-2-pyrrolidone, cyclohexane, water and any combination thereof.

16. A method of manufacturing a waterproof and moisture permeable product, comprising using the electrospun film of claim 1.

* * * * *